United States Patent
Nakatani

(10) Patent No.: US 12,554,807 B2
(45) Date of Patent: Feb. 17, 2026

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventor: Sho Nakatani, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 18/423,772

(22) Filed: Jan. 26, 2024

(65) Prior Publication Data
US 2024/0273168 A1 Aug. 15, 2024

(30) Foreign Application Priority Data
Feb. 15, 2023 (JP) .................. 2023-021435

(51) Int. Cl.
*G06F 21/16* (2013.01)
*H04L 9/00* (2022.01)

(52) U.S. Cl.
CPC .............. *G06F 21/16* (2013.01); *H04L 9/008* (2013.01); *H04L 2209/608* (2013.01)

(58) Field of Classification Search
CPC .... G06F 21/16; H04L 9/008; H04L 2209/608
See application file for complete search history.

(56) References Cited

U.S. PATENT DOCUMENTS

| | | | |
|---|---|---|---|
| 6,421,450 B2* | 7/2002 | Nakano | H04N 19/467 382/100 |
| 7,664,264 B2* | 2/2010 | Moskowitz | H04L 9/16 713/176 |
| 7,984,509 B2* | 7/2011 | Ginter | H04N 21/2541 713/192 |
| 8,180,708 B2* | 5/2012 | Hurtado | H04L 9/3249 713/168 |
| 10,015,564 B2* | 7/2018 | Hunacek | H04N 21/8358 |
| 10,848,821 B2* | 11/2020 | Petrovic | H04N 21/8358 |
| 2002/0078359 A1* | 6/2002 | Seok | G10L 19/018 704/E19.009 |
| 2003/0156716 A1* | 8/2003 | Yokosawa | G11B 20/00855 348/E7.071 |
| 2003/0172277 A1* | 9/2003 | Suzuki | G10L 19/018 704/E19.009 |
| 2004/0022412 A1* | 2/2004 | Iwamura | H04N 19/467 382/232 |

(Continued)

FOREIGN PATENT DOCUMENTS

JP 2009-271512 A 11/2009

OTHER PUBLICATIONS

Onishi et al., Recovery-Conscious Adaptive Watermark Generation for Time-Order Event Stream Processing, IEEE, 2020.*

(Continued)

*Primary Examiner* — David Garcia Cervetti
(74) *Attorney, Agent, or Firm* — SoraIP, Inc.

(57) ABSTRACT

An information processing system that performs stream processing on event information that is encrypted and is sequentially input, the information processing system including a watermark calculation unit that calculates a watermark based on first time information included in the event information and second time information obtained by observing or processing the event information by the information processing system, using secure computation.

5 Claims, 6 Drawing Sheets

(56) References Cited

U.S. PATENT DOCUMENTS

| | | | |
|---|---|---|---|
| 2004/0166873 A1* | 8/2004 | Simic | H04W 64/00 455/423 |
| 2006/0193492 A1* | 8/2006 | Kuzmich | G06T 1/0021 382/100 |
| 2007/0192250 A1* | 8/2007 | Nakamoto | H04L 9/0861 705/50 |
| 2007/0274520 A1* | 11/2007 | Ogata | H04N 21/43622 380/201 |
| 2008/0028426 A1* | 1/2008 | Goto | H04N 9/8227 725/39 |
| 2008/0028474 A1* | 1/2008 | Horne | H04L 9/3226 726/27 |
| 2008/0210747 A1* | 9/2008 | Takashima | G11B 20/00188 235/494 |
| 2008/0240435 A1* | 10/2008 | Celik | G06T 1/0028 380/255 |
| 2009/0010437 A1* | 1/2009 | Takashima | G06F 21/16 |
| 2009/0257584 A1 | 10/2009 | Yanamoto | |
| 2009/0271874 A1* | 10/2009 | Anderson | G06F 21/50 712/225 |
| 2011/0184580 A1* | 7/2011 | Kawamoto | H02J 3/14 700/295 |
| 2015/0221317 A1* | 8/2015 | Baum | G10L 19/018 704/500 |
| 2017/0329943 A1* | 11/2017 | Choi | H04L 63/0428 |
| 2019/0121934 A1* | 4/2019 | Uyeda | G06F 30/20 |
| 2019/0294761 A1* | 9/2019 | Kim | G06F 21/16 |
| 2020/0322124 A1* | 10/2020 | Isshiki | H04L 9/008 |
| 2021/0019893 A1* | 1/2021 | Ananthanarayanan | G06N 3/08 |
| 2021/0110009 A1* | 4/2021 | Liu | G06F 21/57 |
| 2021/0110010 A1* | 4/2021 | Liu | G06N 20/00 |
| 2021/0336786 A1* | 10/2021 | Li | G06F 21/16 |
| 2022/0038478 A1* | 2/2022 | Boudguiga | H04L 9/3247 |
| 2022/0131683 A1* | 4/2022 | Choi | H04L 9/088 |
| 2022/0138115 A1* | 5/2022 | Klaedtke | G06F 12/1425 711/163 |
| 2022/0156366 A1* | 5/2022 | Mishra | H04L 49/109 |
| 2023/0041340 A1* | 2/2023 | Kitagawa | H04L 9/0662 |
| 2023/0058981 A1* | 2/2023 | Tu | H04M 3/568 |
| 2023/0142323 A1* | 5/2023 | Tu | G10L 25/78 700/94 |
| 2024/0185191 A1* | 6/2024 | Bernardi | H04L 9/50 |

OTHER PUBLICATIONS

Burdges et al., Delay Encryption, EUROCRYPT 2021, 2021.*

Park, Heejin, et al., "StreamBox-TZ: Secure Stream Analytics at the Edge with TrustZone", USENIX ATC '19: Proceedings of the 2019 USENIX Conference on USENIX Annual Technical Conference, Jul. 10-12, 2019, pp. 537-554, Renton, WA, USA (Published:Jul. 10, 2019).

Burkhalter, Lukas, et al., "TimeCrypt: Encrypted Data Stream Processing at Scale with Cryptographic Access Control", NSDI'20: Proceedings of the 17th USENIX Symposium on Networked Systems Design and Implementation, Feb. 25-27, 2020, pp. 835-850, Santa Clara, CA, USA (Published: Feb. 25, 2020).

Lu, Wen-Jie, et al., "Non-interactive and Output Expressive Private Comparison from Homomorphic Encryption". ASIACCS '18: Proceedings of the 2018 on Asia Conference on Computer and Communications Security, Jun. 4-8, 2018, pp. 67-73, Incheon, Republic of Korea (Published: May 29, 2018).

Stephen, Julian James, et al., "STYX: Stream Processing with Trustworthy Cloud-based Execution", SoCC '16: Proceedings of the Seventh ACM Symposium on Cloud Computing, Oct. 5-7, 2016, pp. 348-360, Santa Clara, CA, USA (Published: Oct. 5, 2016).

Panagiotis Antonopoulos, et al., "Azure SQL Database Always Encrypted", SIGMOD '20: Proceedings of the 2020 ACM SIGMOD International Conference on Management of Data, Jun. 14-19, 2020, pp. 1511-1525, Portland, OR, USA (Published: May 31, 2020).

* cited by examiner

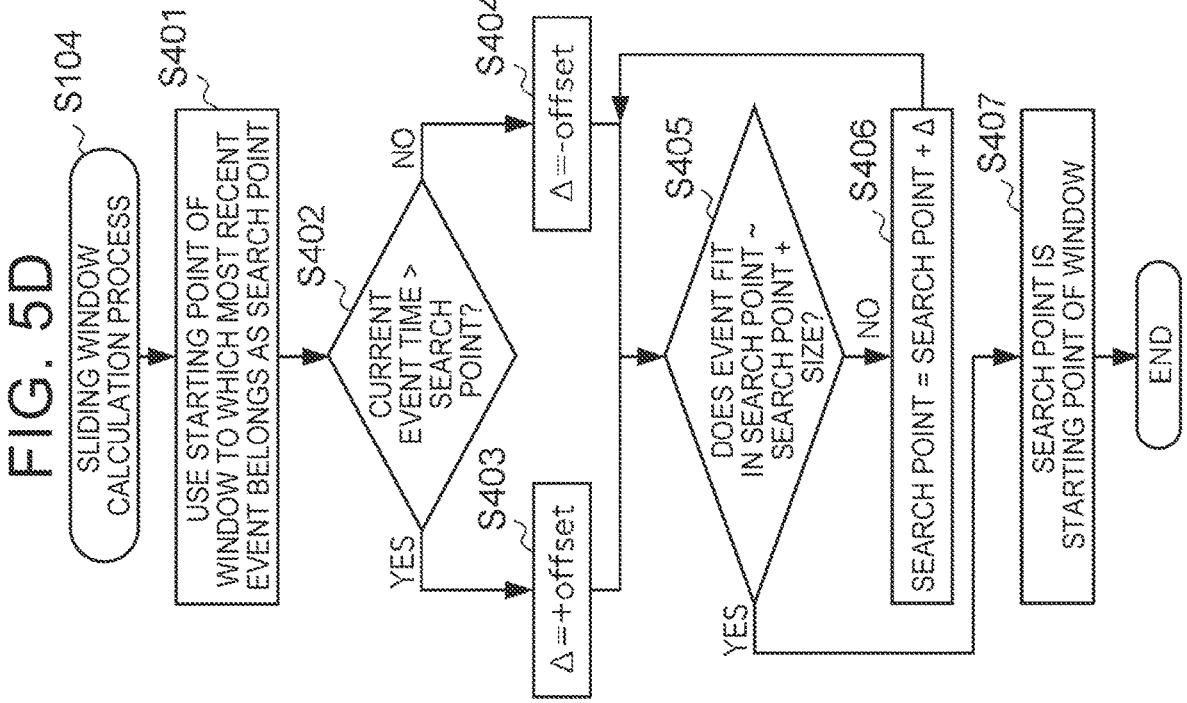
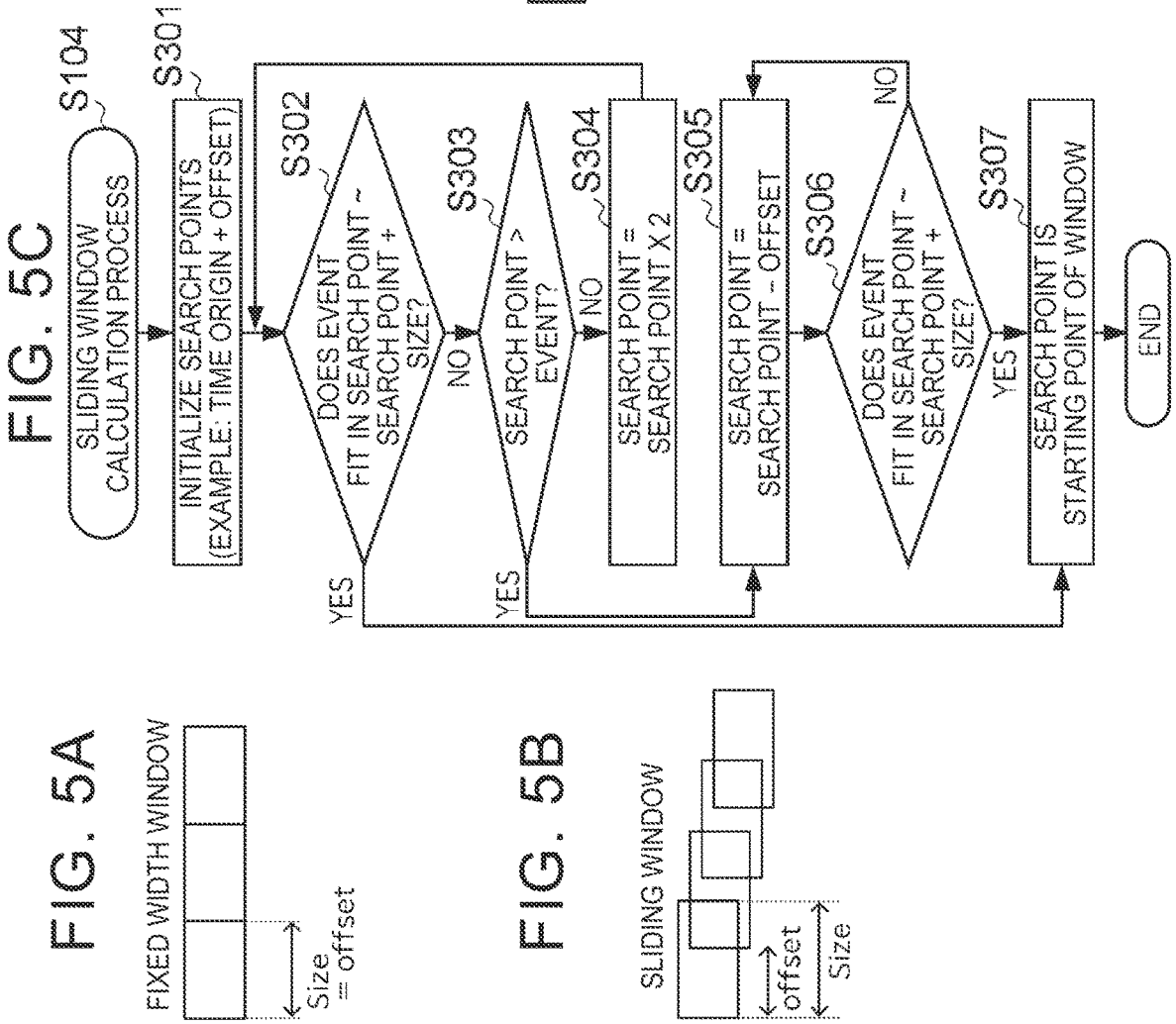

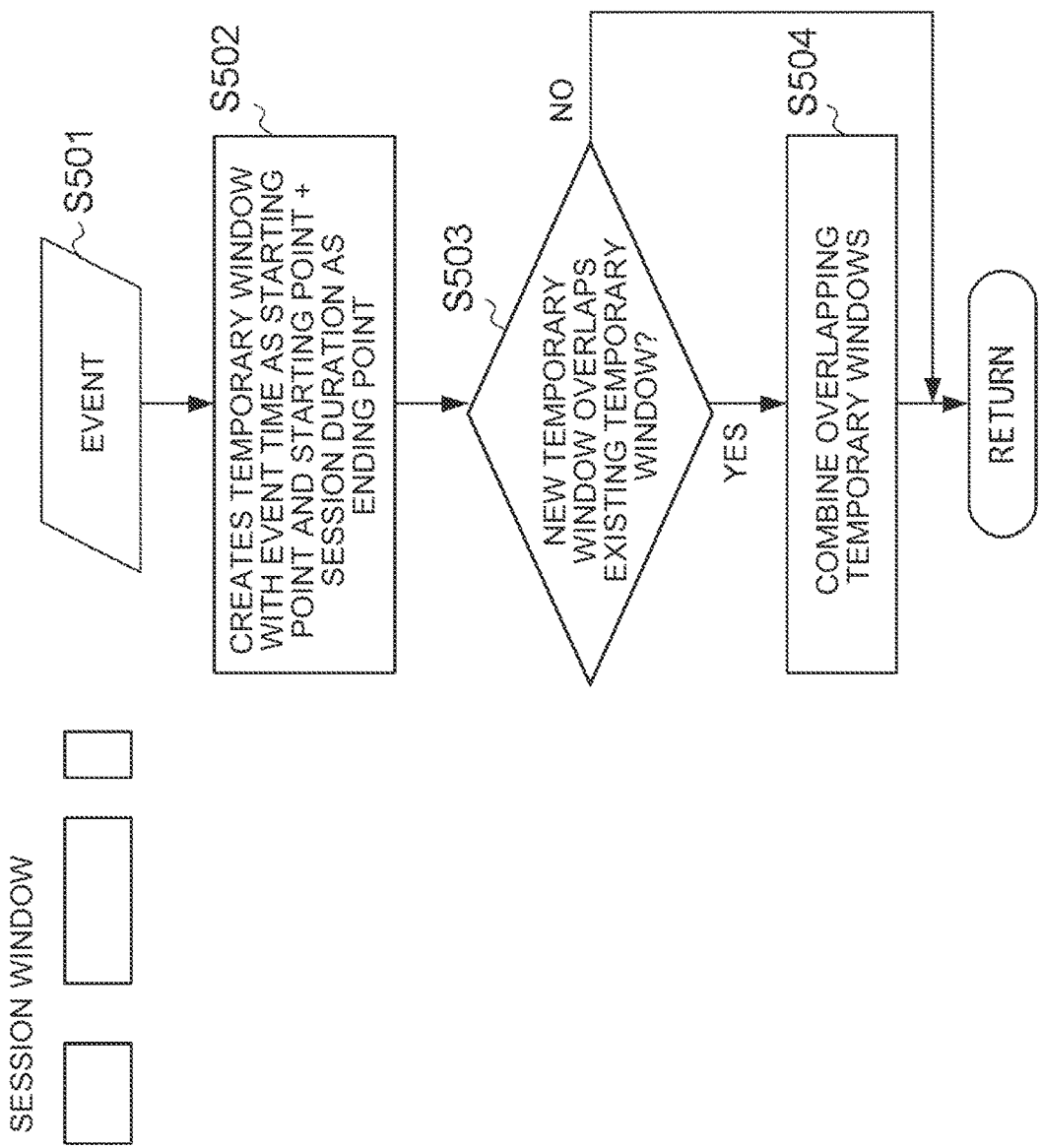

INFORMATION PROCESSING SYSTEM AND INFORMATION PROCESSING METHOD

CROSS-REFERENCE TO RELATED APPLICATION

This application claims priority to Japanese Patent Application No. 2023-021435 filed on Feb. 15, 2023, incorporated herein by reference in its entirety.

BACKGROUND

1. Technical Field

The present disclosure relates to an information processing system and an information processing method.

2. Description of Related Art

Japanese Unexamined Patent Application Publication No. 2009-271512 (JP 2009-271512 A) discloses a method that performs processing of an encrypted video stream at high speed. Specifically, J P 2009-271512 A decrypts the encrypted video stream, performs predetermined processing, and then encrypts only a partial stream that is partially extracted from the stream.

SUMMARY

One aspect of the present disclosure aims to provide a technique that securely handles confidential data in distributed stream processing.

One aspect of the present disclosure is an information processing system that performs stream processing on event information that is encrypted and is sequentially input, and the information processing system includes a watermark calculation unit that calculates a watermark based on first time information included in the event information and second time information obtained by observing or processing the event information by the information processing system, using secure computation.

According to the aspect of the present disclosure, the confidential data can be handled securely with the distributed stream processing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a diagram illustrating a window;

FIG. 5B is a diagram illustrating a window;

FIG. 5C is a flowchart of window calculation processing;

FIG. 5D is a flowchart of window calculation processing;

FIG. 6A is a diagram explaining the window;

FIG. 6B is a flowchart of window calculation processing; and

FIG. 6C is a flowchart of window calculation processing.

DETAILED DESCRIPTION OF EMBODIMENTS

Figure 1:
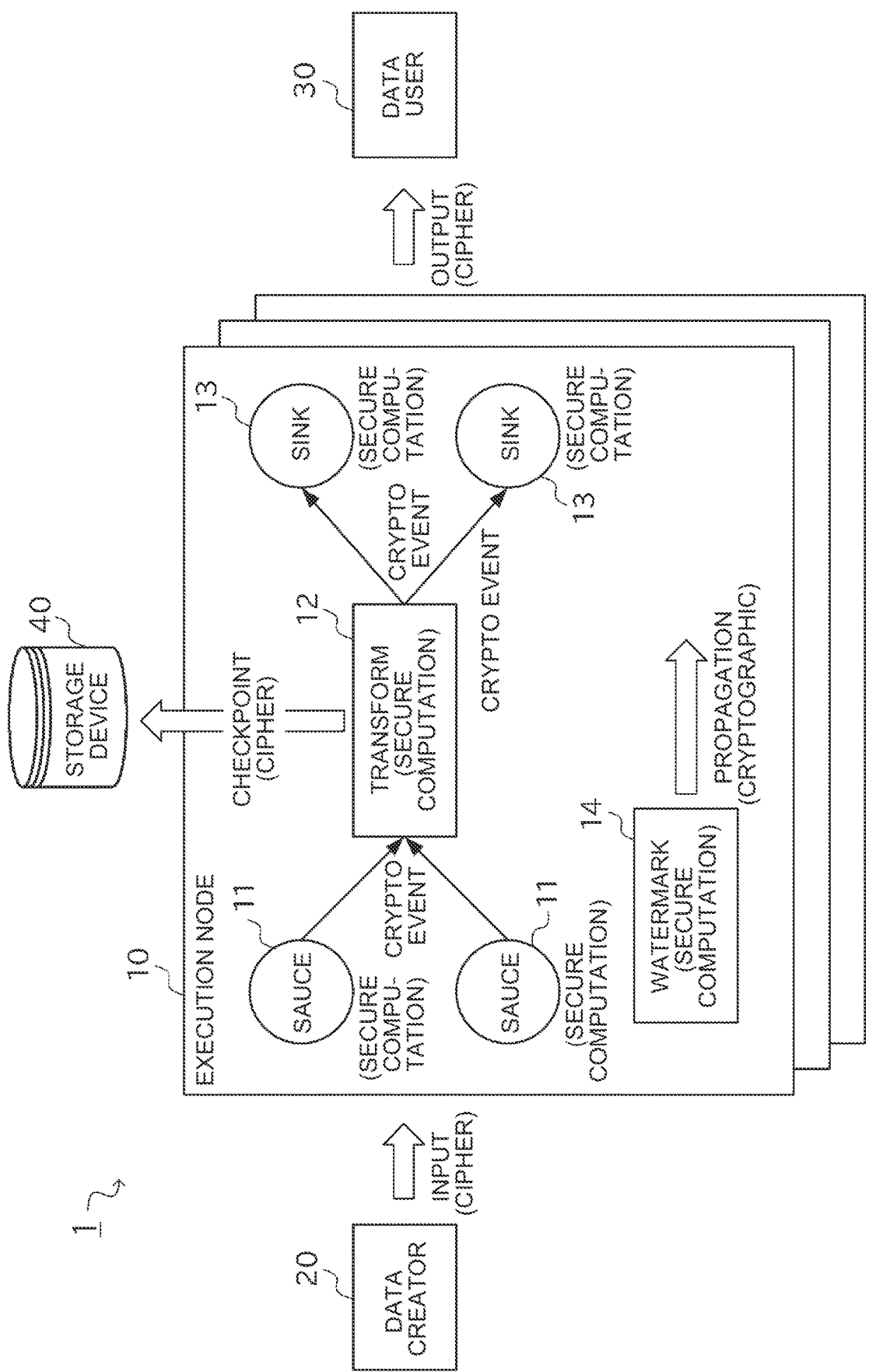
FIG. 1 is a diagram showing an overview of a stream processing system according to one embodiment.

Due to recent technological developments, the amount of data to be collected and processed has increased enormously. For example, a vehicle can be regarded as an IoT device equipped with many sensors, and the amount of data generated by a vehicle per day is expected to reach approximately 10 EB (exabytes) in the near future. Distributed processing is indispensable for handling such large-scale data, and stream processing is considered promising for creating value in quasi-real time.

Also, much of the data needs to be protected as personal data. In addition to data leakage from a stream processing execution node, data leakage in stream processing can be caused by malicious data tapping by an administrator of a stream processing execution node (semi-honest model). This concern is especially noticeable when the administrator of the stream processing execution node is different from the subject who uses the stream processing, for example, when cloud computing is used.

There is research to protect data using secure computation in stream processing. Non-Patent Document 1 (Park, Hecjin, et al. "StreamBox-TZ: secure stream analytics at the edge with TrustZone." Proceedings of the USENIX Conference. 2019.) discloses a method using TEE (Trusted Execution Environment), Non-Patent Document 2 (Burkhalter, Lukas, et al. "TimeCrypt: Encrypted data stream processing at scale with cryptographic access control." Proceedings of the 17th USENIX Symposium on Networked Systems Design and Implementation. USENIX Association, 2020) discloses a method using homomorphic encryption. However, these methods do not give sufficient consideration to security, and there remains a risk of leakage of confidential data.

An object of one embodiment of the present disclosure is to perform stream processing on event information more securely than before.

One embodiment of the present disclosure is an information processing system that performs stream processing on event information that is encrypted and is sequentially input, and the information processing system includes a watermark calculation unit that calculates a watermark based on first time information included in the event information and second time information obtained by observing or processing the event information by the information processing system, using secure computation.

Since the watermark in stream processing is calculated based on the first time information (for example, event occurrence time) included in the event information, it is possible to guess the event occurrence time if the watermark is leaked. Then, it is possible to guess the content of the event sequence from the event occurrence time sequence. Thus, not only the event occurrence time but also the watermark itself must be protected as confidential information. According to this embodiment, since the watermark is calculated using secure computation, even if the administrator of the stream processing execution node is a malicious person, it is possible to prevent the plaintext of the watermark from being leaked to the outside, which provides higher security than before.

The secure computation used to calculate the watermark may be a method using TEE or a method using homomorphic encryption. The watermark can be calculated as the addition of the second time information (the time when the system observed (including reception) or processed the event information) and the allowable delay time, and the addition is an operation that can be realized with homomorphic encryption. Thus, by calculating the watermark from the event information in the isolated execution environment using the TEE, or by calculating the encrypted watermark from the encrypted event information using homomorphic encryption, the plaintext of the watermark leakage can be prevented.

In this embodiment, at least one of the time width window and the session window may be calculated using secure computation. The time width window and the session window are also information calculated based on the first time information of the event information, and need to be protected as confidential information like the watermark.

In this embodiment, the window calculation unit may calculate a starting point or an ending point of a time width window to which event information to be processed belongs by searching starting from time origin or searching starting from a starting point or an ending point of a window to which latest event information belongs, and identify the time width window. A time width window can be defined by specifying its starting point or the ending point. The process of determining whether the window to which the event information being processed belongs corresponds to the time width or the range shifted by an integral multiple of the time width from the starting point can be realized by addition and magnitude comparison. It is an operation that can be processed using homomorphic encryption. By using the starting point or ending point of the time width to which the latest event information belongs as the starting point, the searching range can be limited and the window can be calculated at a higher speed.

Another embodiment of the present disclosure is an information processing method performed by the information processing system. Further, another embodiment of the present disclosure can be regarded as a computer program for causing a computer to function as the above information processing system, or a computer program for causing a computer to execute the above information processing method.

Hereinafter, embodiments of the present disclosure will be described with reference to the drawings. The configurations of the following embodiments are illustrative, and the present disclosure is not limited to the configurations of the embodiments.

System Configuration

FIG. 1 is a diagram showing a schematic configuration of a stream processing system (information processing system) according to one embodiment. Stream processing system 1 includes stream processing execution node (hereinafter simply referred to as execution node) 10, data creator device 20, data user device 30 and storage device 40. There may be one or more execution nodes 10, which collectively form a pipeline of one or more stages. A minimum unit of data flowing through a pipeline is called an event or event information. The stream processing system 1 is required to process input events with low latency. An object of the present embodiment is to suppress the leakage of events to the outside, and in particular, to suppress malicious eavesdropping by an administrator of the execution node 10.

The data creator device 20 may be any device as long as it requests the execution node 10 to process an event. For example, the data creator device 20 is a device including a sensor and inputs data acquired from the sensor to the execution node as event information. As an example, the data creator device 20 is a vehicle or mobile body equipped with various sensors.

The data user device 30 is a device that uses information processed by the execution node 10, and its usage method and usage purpose are not particularly limited.

The execution node 10 acquires encrypted input from data creator device 20 and outputs a processing result to data user device 30. Although the number of execution nodes 10 may be one, each execution node 10 may process an event inputted in cooperation with a plurality of execution nodes 10. An execution node 10 has one or more sources 11, one or more transforms 12 and one or more sinks 13. Transform 12 is the entity that performs each processing in the pipeline. The source 11 is a transform that acquires an event from an external data source (here, the data creator device 20) and inputs it to the stream processing system. The sink 13 is a transform that outputs the result of stream processing to an external data sink (here, the data user device 30). If the stream processing system is composed of multiple execution nodes, some of the execution nodes 10 may not have either or both of the source 11 and sink 13.

The stream processing system 1 has one or more execution nodes 10 and generally has a pipeline structure in which one or more transforms are connected.

As shown in FIG. 1, execution node 10 obtains encrypted events from data creator device 20 or other execution nodes, and performs secure computations at source 11, transform 12, and sink 13. Also, the execution node 10 outputs the event of the calculation result to the data user device 30 or another execution node 10 in an encrypted state. In this way, events flow through the pipeline in an encrypted state, and computations on events are also performed by secure computation, so that events can be prevented from being leaked to the outside.

The stream processing system 1 according to this embodiment also obtains the watermark 14 by secure computation. Although the details will be described later, the watermark 14 represents a time when it is estimated that no event having an event time earlier than this will be input. Note that the event time is the date and time that characterizes the event, for example, the date and time of occurrence of the event. On the other hand, the event processing time is the date and time when the stream processing system 1 processed the event, for example, the date and time when the stream processing system 1 received the event. Events are not necessarily input to the stream processing system 1 in order of occurrence, and the order of input to the system may differ from the order of occurrence. Therefore, the stream processing system 1 uses a watermark so as not to accept an event whose time has passed the watermark, and to proceed with the process. Note that the event time corresponds to the first time information in the present disclosure, and the event processing time corresponds to the second time information in the present disclosure.

The watermark 14 can be said to be highly confidential data to be protected. The event time column acts as an action log, leading to inferences about the contents of the data column. Then, the event time sequence can be inferred from the watermark. Therefore, it can be said that the content of the data string can be guessed from the watermark. For example, consider a pipeline that analyzes the behavior of individual vehicles. This pipeline accepts a set of (vehicle ID, start date and time, end date and time) as data and evaluates driving behavior. If a third party obtains information that this pipeline is investigating some kind of accident, this third party may be able to deduce the incident being investigated from the event time sequence inferred from the watermark. Thus, the watermark 14 is highly confidential information that should be protected. For similar reasons, event-time-based windows are also information that should be protected. Based on the new knowledge that watermarks and windows correspond to highly confidential information, the present embodiment performs calculations of watermarks and windows by secure computation to suppress such information from being leaked to the outside.

In addition, the execution node 10 saves checkpoints in the non-volatile storage device 40 in preparation for system failure. If any of the transforms in the pipeline are stateful, saving the input events alone won't be able to reproduce the processing on failure, and saving the internal state (e.g. how many events have been processed so far) will be necessary. A checkpoint is an internal state that should be saved. Since checkpoints are state data and can be highly confidential data, checkpoints are encrypted and stored in the storage device 40 in this embodiment.

Configuration Example 1

Figure 2A:
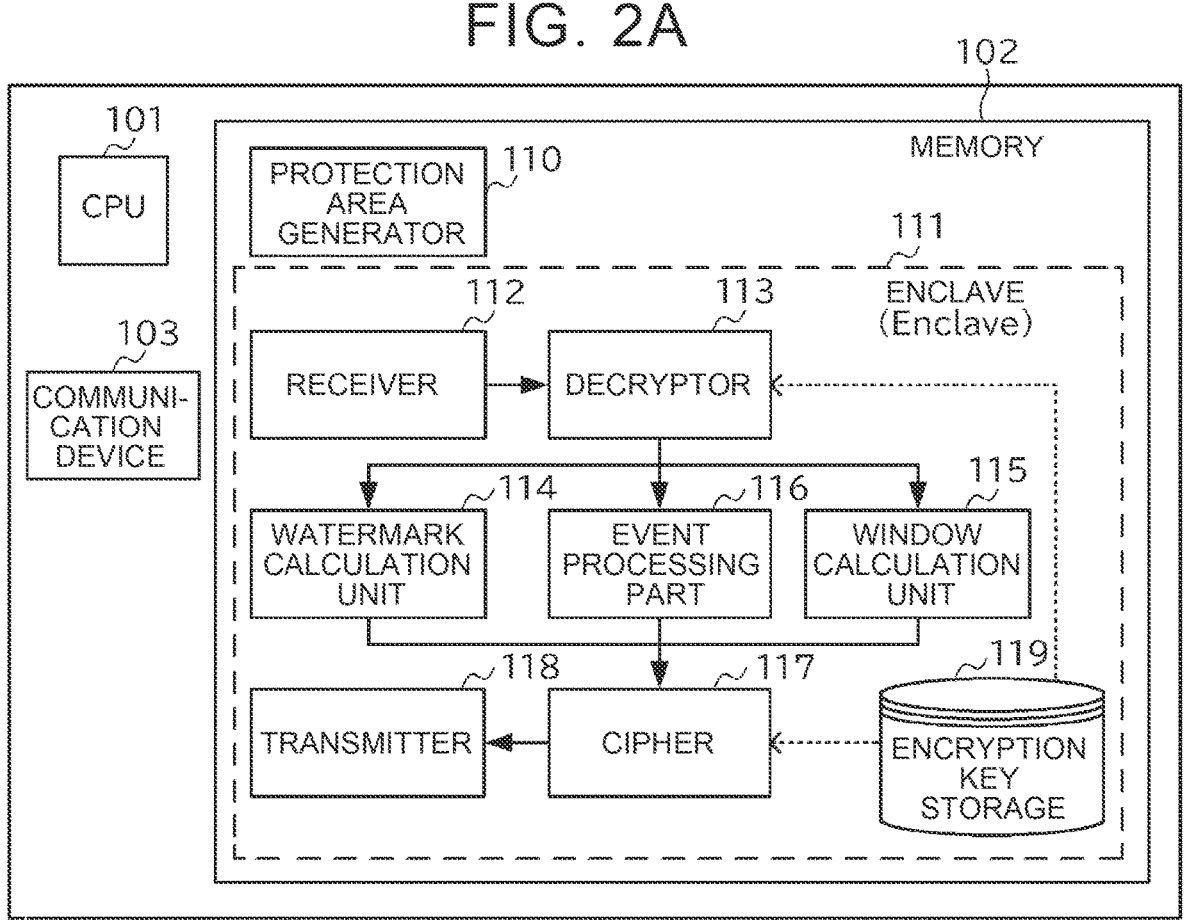
FIG. 2A is a block diagram of an execution node according to one embodiment.

FIG. 2A is a diagram showing the configuration of the execution node 10 according to one embodiment. In this embodiment, the execution node 10 performs secure computation using a Trusted Execution Environment (TEE).

The execution node 10 is a computer (information processing device) including a CPU 101, a memory 102 and a communication device 103. The CPU 101 has a memory encryption engine, logically separates the memory 102, and creates a protected area (enclave) that is inaccessible from the outside. Since the CPU 101 itself is also protected, the contents of calculations in the protected area are not leaked to the outside, and input/output is also encrypted, so leakage to the outside can be prevented.

CPU 101 executes a program stored in memory 102 to function as protection area generation unit 110, reception unit 112, decryption unit 113, watermark calculation unit 114, window calculation unit 115, event processing unit 116, encryption unit 117, a transmission unit 118, and an encryption key storage unit 119. Some or all of these functional units may be implemented by dedicated hardware circuits.

A protected area generation unit 110 generates a protected area (enclave) 111 in the memory 102. Channels within protected area 111 and between protected area 111 and CPU 101 other hardware and OS are protected.

Figure 2B:
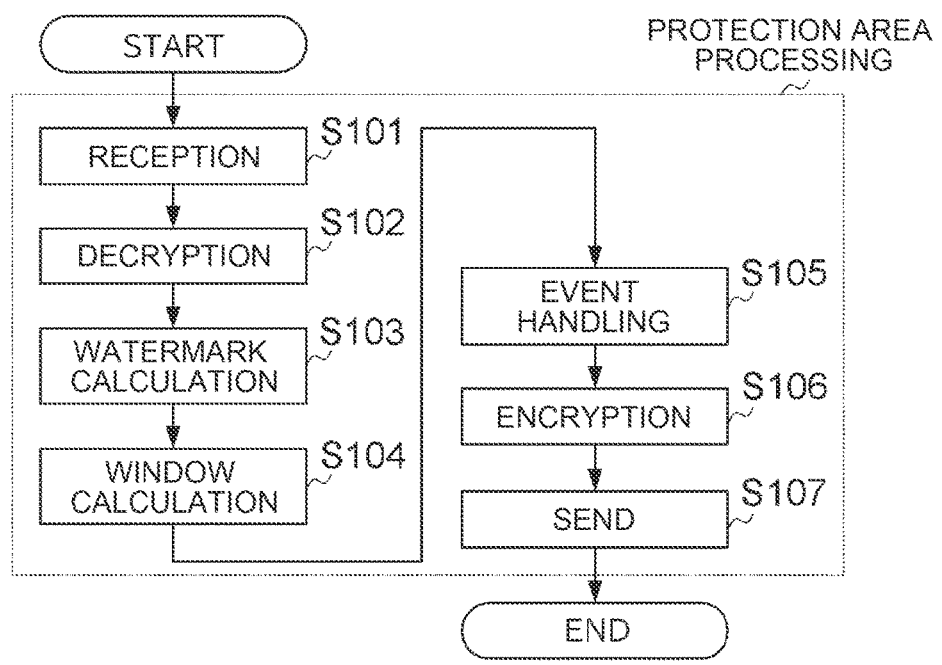
FIG. 2B is a flowchart of processing performed by an execution node in one embodiment.

FIG. 2B is a flowchart showing the flow of processing performed by the execution node 10. In S101, the receiving unit 112 receives a cryptographic event from an external node (data creator device 20 or another execution node 10). In S102, the decryption unit 113 decrypts the received encrypted event using the encryption key stored in the encryption key storage unit 119 and converts it into plain text. In S103, the watermark calculation unit 114 calculates a watermark from the event. In S104, the window calculation unit 115 calculates a window from the event. In S105, the event processing unit 116 performs main processing for the event. The content of event processing is not particularly limited in the present disclosure, and may be arbitrary processing. The order of the processing from S103 to S105 is not particularly limited, and the processing may be performed in an appropriate order or may be performed in parallel. In S106, the encryption unit 117 uses the encryption key stored in the encryption key storage unit 119 to encrypt the processing result (including the watermark and window). In S107, the transmission unit 118 outputs the encrypted processing result (which also corresponds to an event) to the external node (data user device 30 or another execution node 10). It should be noted that all of the processes from S101 to S107 described above are executed within the protected area 111.

Configuration Example 2

Figure 3A:
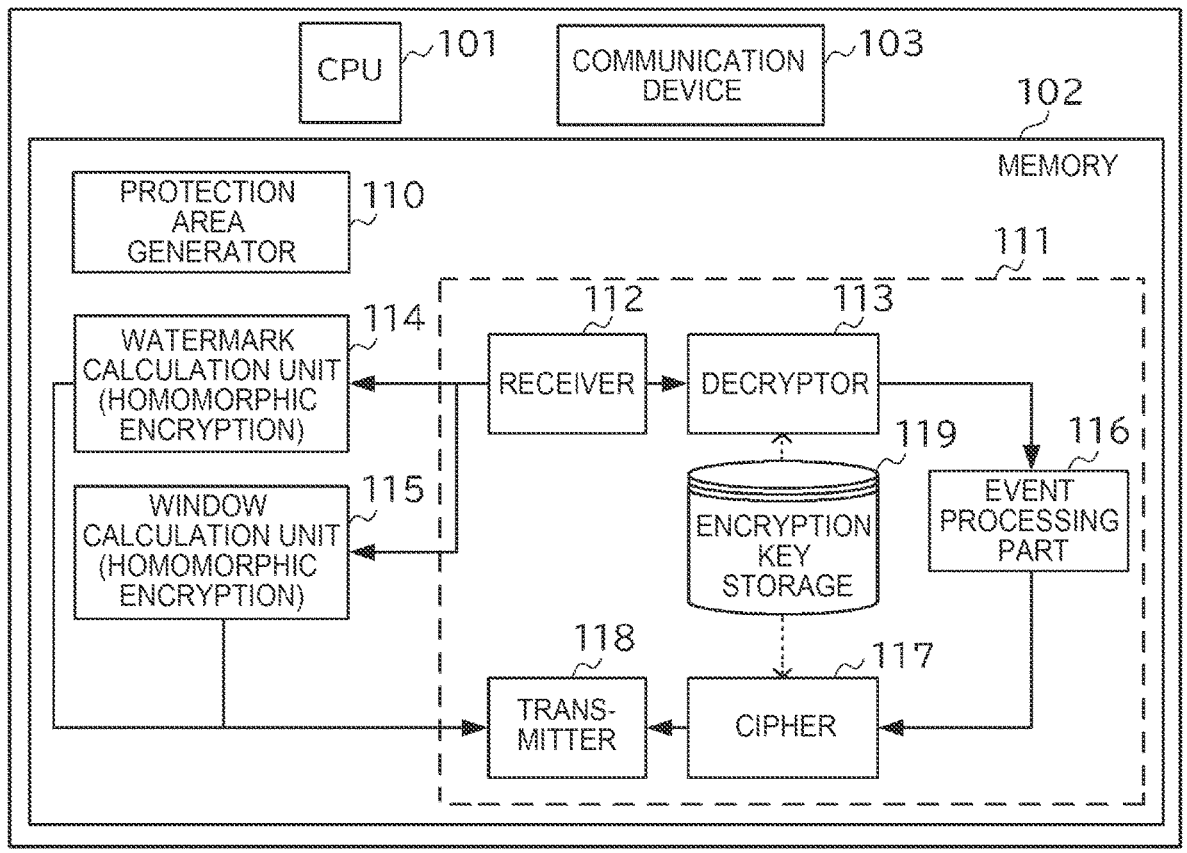
FIG. 3A is a block diagram of an execution node according to another embodiment.

FIG. 3A is a diagram showing the configuration of an execution node 10 according to another embodiment. In this embodiment, the execution node 10 performs secure computation using homomorphic encryption computation in addition to TEE.

In FIG. 3A, the same components as those in FIG. 2B are denoted by the same reference numerals, and detailed description thereof will be omitted. The configuration of the execution node 10 in this embodiment is basically the same as in FIG. 2A. However, in this embodiment, the watermark calculation unit 114 and the window calculation unit 115 are executed outside the protected area 111. The watermark calculation unit 114 and the window calculation unit 115 perform calculation using homomorphic encryption to process the encrypted event while it is still encrypted, and obtain an encrypted calculation result. Therefore, it is possible to prevent the watermark and window calculation process and the plain text of the processing result from being leaked to the outside.

Figure 3B:
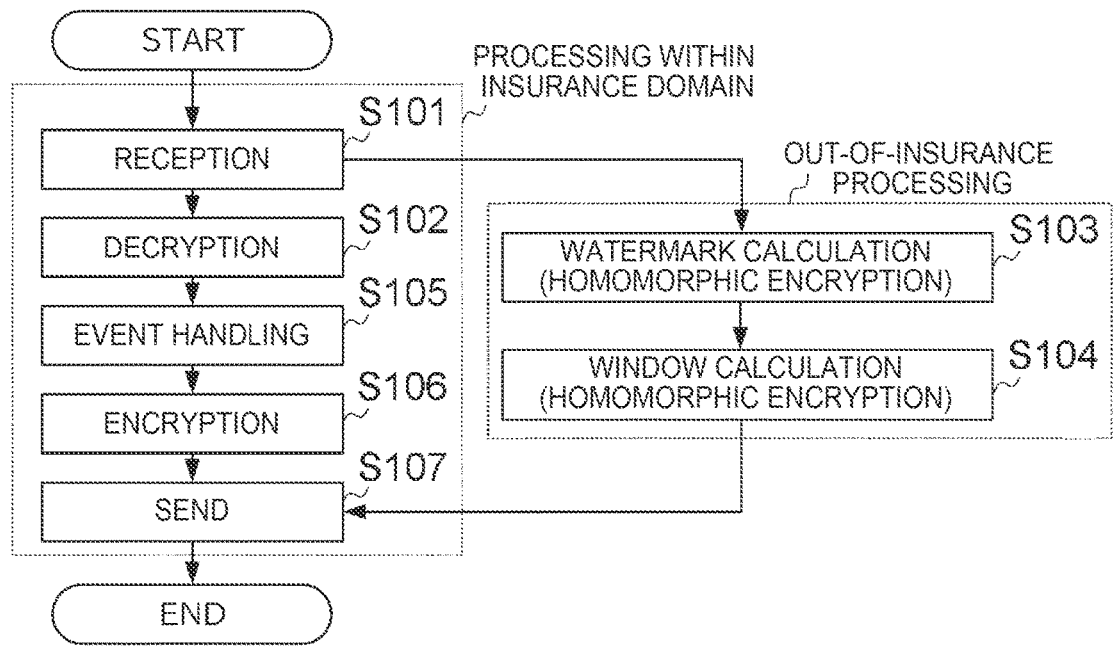
FIG. 3B is a flowchart of processing performed by an execution node in another embodiment.

FIG. 3B is a flowchart showing the flow of processing performed by the execution node 10 in this embodiment. The same reference numerals are assigned to the same processes as in FIG. 2B, and detailed description thereof will be omitted. The event processing S105 is performed on the plaintext obtained by decrypting the received event, encrypts the processing result and transmits it, and is performed within the protected area 111, as in FIG. 2B. On the other hand, the watermark calculation processing S103 and the window calculation processing S104 differ from FIG. 2B in the following points. The calculation of the watermark and window in this example is performed on the received cryptographic event without decrypting it, resulting in an encrypted processing result. As described above, the watermark calculation processing S103 and the window calculation processing S104 are executed outside the protected area 111.

Other Configuration Examples

In configuration example 2, the processes of the watermark calculation unit 114 and the window calculation unit 115 are implemented using asymmetric encryption, but only one of them may be implemented using asymmetric encryption, or part or all of the other functions may be implemented using asymmetric encryption.

Watermark Calculation Process

The watermark calculation processing S103 performed by the watermark calculation unit 114 will be described with reference to FIGS. 4A and 4B.

The watermark represents the time at which it is assumed that no event with an earlier event time will be entered. The receiving unit 112 (or other functional unit) treats an event having an event time before the watermark as delayed data and does not subject it to normal processing. The event time is the date and time that characterizes the event, for example, the date and time of occurrence of the event. The event time is stored in the event as one of the fields of the event when data creator device 20 generates the event. The event processing time is the date and time when the stream processing system 1 processed the event, for example, the date and time when the stream processing system 1 received the event. The event processing time is added as a new field to the event when the execution node 10 (for example, the receiving unit 112) processes the event.

Figure 4A:
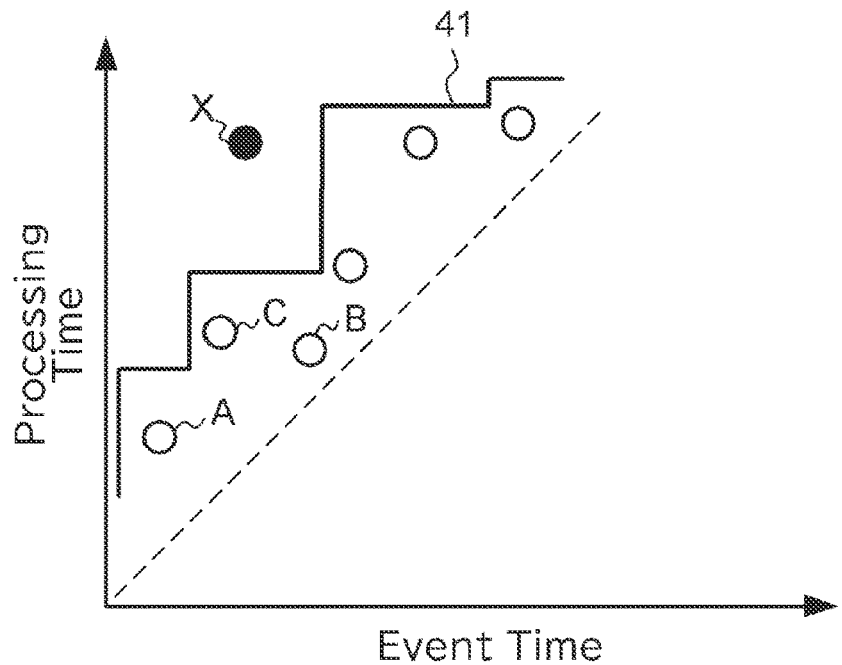
FIG. 4A is a diagram illustrating a watermark.

FIG. 4A is a diagram explaining a watermark. The horizontal axis of the diagram represents event time, and the vertical axis represents event processing time. Each circle in the figure represents an event, and a polygonal line 41 represents a watermark. Also, the dotted line in the drawing represents a state in which the event time and the event processing time are equal. In the following explanation, the event processing time is assumed to be the time when the event is received by the receiving unit 112.

Events are not necessarily received in order of event times (e.g., event occurrence times). Event B in the figure has an event time later than event C, but is received earlier than event C. Thus, the watermark 41 is the threshold for how late an event is allowed to arrive. As shown, the watermark 41 is updated from time to time. If the event time is before the watermark when the event is received, the execution node 10 treats the received event as delay data and does not process it normally. In FIG. 4A, event X is treated as delayed data because it has an event time before the watermark at the time of reception.

Figure 4B:
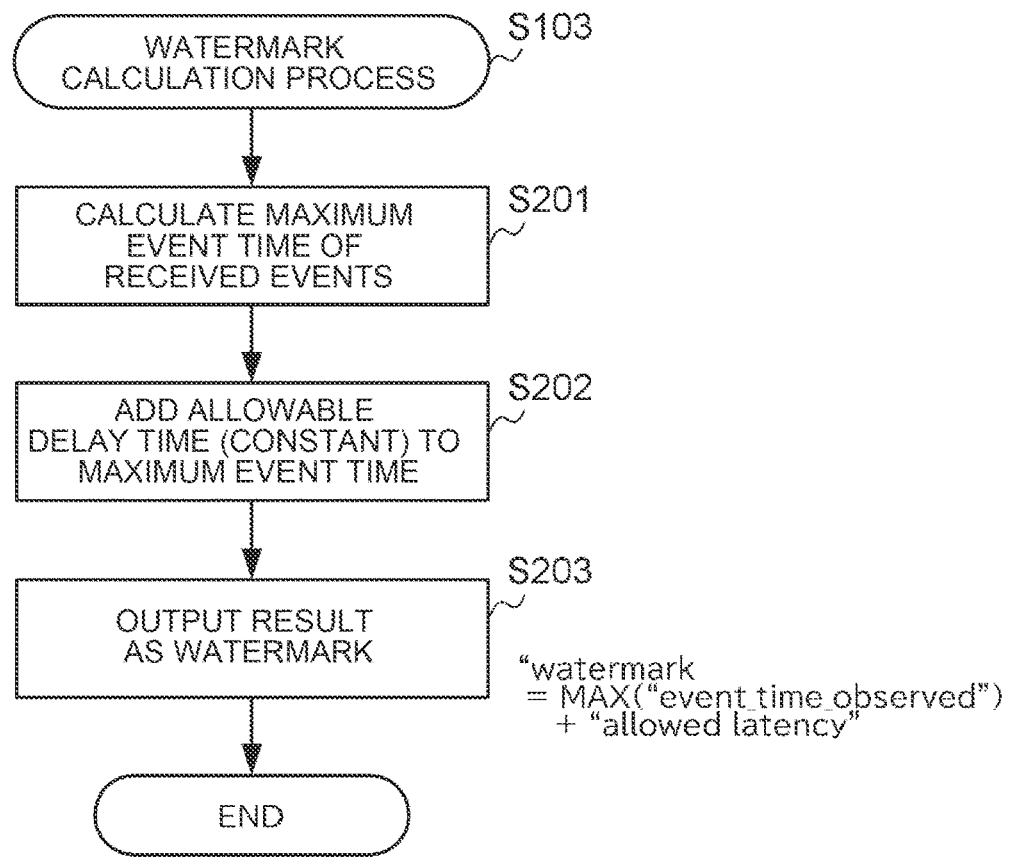
FIG. 4B is a flowchart of the watermark calculation process.

FIG. 4B is a flowchart showing the flow of watermark calculation processing S103. This process is executed each time a new event is received. The watermark calculation unit 114 calculates the maximum event time of received events in S201, and adds the allowable delay time to the maximum event time in S202. Note that the allowable delay time is a constant given in advance by the pipeline designer. In S203, the watermark calculation unit 114 outputs the processing result of S202 as a watermark.

The above watermark calculation process is synonymous with the following formula. Note that MAX is a function that returns the maximum value.

"Watermark" =
MAX("Event time of received event") + "Tolerable delay time"

Note that instead of actually performing processing using the MAX function, the maximum event time is stored, and if the event time of a newly received event is greater than the previous maximum event time, the maximum event time may be updated with the event time of the newly received event.

In the above calculation formula, the addition of the first and second terms on the right side is a typical operation that can be realized by homomorphic encryption. The process of obtaining the maximum value of the first term on the right side can be realized by using homomorphic encryption that can realize magnitude comparison. Homomorphic encryption that allows size comparison is described in Non-Patent Document 3 (Lu, Wen-Jie, Jun-Jie Zhou, and Jun Sakuma. 2018. "Non-Interactive and Output Expressive Private Comparison from Homomorphic Encryption." In Proceedings of the 2018 on Asia Conference on Computer and Communications Security, 67-74. ASIACCS 18. New York, NY, USA: Association for Computing Machinery).

If the watermark is calculated as described above, the watermark can be obtained by secure computation not only in the case of secure computation using TEE (FIG. 2A), but also in the case of secure computation using homomorphic encryption (FIG. 3A).

Window Calculation Process

Window calculation processing S104 performed by the window calculation unit 115 will be described with reference to FIGS. 5A to 5D and FIGS. 6A to 6C. This embodiment uses a window called an event-time-based window that is calculated based on the event time.

A window represents a processing target period when the event processing unit 116 aggregates events. There are three types of windows: fixed width windows, sliding windows, and session windows.

FIG. 5A is a diagram explaining a fixed-width window, and FIG. 5B is a diagram explaining a sliding window. The fixed-width window is a method of arranging windows having a fixed-width size (Size) without overlapping and without gaps. The sliding window is a method in which windows having a fixed size (Size) are shifted by a slide width (offset) to overlap the windows. A fixed-width window can be regarded as a sliding window in which the slide width (offset) is the same as the window width (size). Therefore, the method for calculating the sliding window will be described below, and the description of the method for calculating the fixed width window will be omitted. In this disclosure, fixed-width windows and sliding windows are also collectively referred to as time width windows.

The window calculation processing S104 can be said to be a process of specifying a window to which a certain event belongs. Since a window can be uniquely determined by specifying its starting point or ending point, the process of specifying the window to which an event belongs can be reduced to the problem of finding either the starting point or the ending point of the window to which it belongs. Here, an example of finding the starting point will be described, but the same procedure can be used to find the ending point.

Here, when event c of event time Tc, slide width offset, and window width size are given, the starting point time Start of the window to which the event belongs is obtained as follows.

$$Start = Tc - (Tc + size - offset)\% \; size$$

While the above calculation can be easily realized in the secure computation using TEE (FIG. 2A), it is feasible in the secure computation using homomorphic encryption (FIG. 3A) because it includes the remainder operation (%), but is expected to take time. Therefore, a window calculation process that can be executed at high speed even when homomorphic encryption is used will be described.

FIG. 5C is a flowchart showing an example of window calculation processing S104 that can be performed at high speed using homomorphic encryption. In S301, the window calculation unit 115 initializes the search points to initial values. Here, the initial value can be any value, for example, the time obtained by adding the slide width offset to the time origin (1970/1/1 00:00:00 in Unix timestamp), or the time obtained by adding the slide width offset to the system startup time. However, it is preferable to set the initial value to a value smaller than the event time of the event to be handled.

In S302, the window calculation unit 115 determines whether the event time Tc of the event c falls within the time width from the search point to the search point+size. In the case of a negative determination, the window calculation unit 115 doubles the value of the search point until the search point exceeds the event time Tc, and returns the process to S302 (S303, S304). If the search point exceeds the event time Tc, the window calculation unit 115 subtracts the slide width offset from the value of the search point in S305. It is determined whether the event time Tc of the event c falls within the time width from the search point to the search point+size in S306. In the case of a negative determination, the window subtracts the search point by the time width offset until the event falls within the time width from search point to search point (S305, S306).

If the determination in S302 or S306 is affirmative, the process proceeds to S307, and the window calculation unit 115 determines the current search point as the starting point of the window. The ending point of the window is obtained by adding the window width size to the starting point.

Since the above processing can be realized only by addition, multiplication, and size comparison, it can also be realized at high speed by secure computation using homomorphic encryption. Note that the window calculation can also be realized by a sequential search in which the search point is shifted by the slide width offset from the time origin, but by using the binary search as described above, the window can be specified at a higher speed. Note that the above calculation method is merely an example, and any search method generally called binary search may be adopted.

FIG. 5D is a flowchart showing another example of the window calculation processing S104 that can be executed at high speed using homomorphic encryption. Note that the processing shown here is processing that can be applied when the window to which one or more events belong has already been obtained.

In step 401, the window calculation unit 115 sets the starting point of the window to which the latest event belongs as the search point. In S402, the window calculation unit 115 compares the event time Tc of the current event c with the search point in S402. The window calculation unit 115 sets the time increment $\Delta$ to +offset in S403 if the event time Tc is greater, and sets the time increment $\Delta$ to—offset in S404 if the event time Tc is shorter.

In S405, it is determined whether the event time Tc of the event c falls within the time width from the search point to the search point+size. In the case of a negative determination, in S406, the window calculation unit 115 adds the time increment $\Delta$ to the search point, and performs the determination of S405 again. If the determination in S405 is affirmative, in S407 window calculation unit 115 determines the current search point as the starting point of the window. The ending point of the window is obtained by adding the window width size to the starting point.

Since this window calculation method can also be realized only by addition, subtraction, and size comparison, it can be realized at high speed by homomorphic encryption. Furthermore, since the window starting point to which the most recent event belongs is used as the initial value of the search point, it is possible to calculate the window even faster.

FIG. 6A is a diagram explaining a session window. A session window is a method of setting consecutive events in a short period of time as one window. Here, the session duration is given as a parameter, and if the absolute value of the difference between the event times of two events is less than or equal to the session duration, the window is set so that these two events belong to the same window.

6B and 6C are flowchart showing the flow of session window calculation processing in this embodiment. In this example, the window calculation process is performed by an event trigger.

FIG. 6B shows processing performed in S501 when a new event is received or needs to be processed. In S502, the window calculation unit 115 generates a temporary window whose starting point is the event time Tc and whose ending point is the starting point+session duration. In S503, the window calculation unit 115 determines whether the new temporary window generated in S502 overlaps with an existing temporary window, and if so, combines the overlapping temporary windows in S504.

FIG. 6C shows processing performed when the watermark calculation unit 114 updates the watermark in S601. In S602, the window calculation unit 115 determines whether there is a provisional window whose ending point is before the watermark. If there is, this provisional window is determined as a session window in S603.

In this way, the session window can be confirmed after confirming that no new event arrives within the session duration from the latest event time in the temporary window.

Since all of the above processes can be realized only by addition, subtraction, and size comparison, they can be realized not only by secure computation using TEE, but also by secure computation using homomorphic encryption.

Advantageous Effects of this Embodiment

According to the stream processing system according to the present embodiment, the entire pipeline from the data creator device 20 to the data user device 30 can be concealed end-to-end. It can prevent leakage. In particular, even under the semi-honest hypothesis, which regards eavesdropping by the administrator of execution nodes as a threat, the stream processing system can be operated in a completely encrypted state.

One feature of this embodiment is that, based on the new knowledge that watermarks and windows are highly confidential information, secure computation is applied to these information. Secure computation may be implemented by both TEE and homomorphic encryption. One of the further characteristics of this embodiment is that, in view of the high calculation cost of homomorphic encryption, a calculation method that can reduce the calculation cost using watermark and window homomorphic encryption is proposed.

Other Embodiments

The above-described embodiment is merely an example, and the present disclosure may be appropriately modified and implemented without departing from the scope thereof.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, HDD, etc.) and an optical disc (compact disc read-only memory (CD-ROM), digital versatile disc (DVD), Blu-ray disc, etc.), a ROM, a RAM, an EPROM, an electrically erasable programmable read only memory (EEPROM), a magnetic card, a flash memory, an optical card, and any type of medium suitable for storing electronic commands.

What is claimed is:

1. An information processing system that performs stream processing on encrypted event information that is sequentially input, the information processing system comprising:
a processor; and a memory storing program instructions that cause the processor to:
    generate a protected area in the memory; and
    generate a watermark based on
        a maximum event time calculated first time information that is included in the event information and that indicates a time at which an event occurred,
        a time constant indicating an allowable delay time that is added to the maximum event time, and
        second time information indicating the time at which the information processing system observes the event information, wherein
    the information processing system does not accept for processing the encrypted event information for which the first time information is past the watermark.

2. The information processing system according to claim 1, wherein the watermark is calculated using a Trusted Execution Environment (TEE) or homomorphic encryption.

3. The information processing system according to claim 1, wherein the program instructions further cause the processor to
    calculate at least one of a time width window and a session window based on the first time information.

4. The information processing system according to claim 3, wherein the program instructions further cause the processor to
    calculate a starting point or an ending point of a time width window to which event information to be processed belongs by searching starting from time origin or searching starting from a starting point or an ending point of a window to which latest event information belongs, and identifies the time width window.

5. An information processing method that performs stream processing on encrypted event information that is sequentially input to an information processing system that includes a processor and a memory, the information processing method comprising:
    generating a protected area in the memory of the information processing system;
    generating a watermark based on
        a maximum event time calculated first time information that is included in the event information and that indicates a time at which an event occurred,
        a time constant indicating an allowable delay time that is added to the maximum event time, and
        second time information indicating that the time at which the information processing system observes the event information; and
    rejecting processing of the encrypted event information for which the first time information is past the watermark.

* * * * *